US012804005B2

(12) United States Patent
Chen et al.

(10) Patent No.: US 12,804,005 B2
(45) Date of Patent: Nov. 17, 2026

(54) ROOT DOMAIN BENIGNITY EVALUATION

(71) Applicant: Palo Alto Networks, Inc., Santa Clara, CA (US)

(72) Inventors: Zhenhua Chen, Milpitas, CA (US); Mohamed Yoosuf Mohamed Nabeel, San Jose, CA (US); Daiping Liu, Sunnyvale, CA (US); Fan Fei, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 207 days.

(21) Appl. No.: 18/759,092

(22) Filed: Jun. 28, 2024

(65) Prior Publication Data

US 2026/0006058 A1 Jan. 1, 2026

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01); *H04L 63/1483* (2013.01)

(58) Field of Classification Search
CPC .. H04L 63/1433; H04L 41/16; H04L 63/1483
See application file for complete search history.

(56) References Cited

U.S. PATENT DOCUMENTS 8,819,209 B1 * 8/2014 Chen ................... H04L 61/4511 709/223
10,440,042 B1 * 10/2019 Stein ...................... G06N 20/00
10,673,814 B1 * 6/2020 Huffner ............... H04L 61/3005
10,944,781 B1 * 3/2021 Bilge ..................... G06F 17/18
12,373,425 B1 * 7/2025 Rai ....................... G06F 16/248
(Continued)

FOREIGN PATENT DOCUMENTS

EP 3252646 A1 * 12/2017 ............. G06N 20/00
WO WO-2010147794 A1 * 12/2010 ......... G06F 16/1865
WO WO-2022175709 A1 * 8/2022 ............... G06N 3/09

OTHER PUBLICATIONS

Koide, et al., "Detecting Phishing Sites Using ChatGPT", arXiv:2306.05816v2, Feb. 15, 2024, 15 pages.
(Continued)

*Primary Examiner* — Kyung H Shin
(74) *Attorney, Agent, or Firm* — Gilliam IP PLLC

(57) ABSTRACT

A root domain evaluation service prompts a language model with task instructions to evaluate various aspects of the root domain that inform a prediction of whether the root domain is benign, where the prompt comprising the task instructions has been engineered so that results of the benignity evaluations provided by the language model can be leveraged to obtain first feature values of the root domain. The service also obtains second feature values of the root domain that comprise data and/or metadata of the root domain. The service inputs the first and second feature values into a classifier trained to predict whether a root domain is benign based on the corresponding features to obtain a prediction of the root domain's benignity. The service also analyzes the second feature values based on heuristics for benign domain name detection to further inform whether the root domain is benign.

20 Claims, 4 Drawing Sheets

(56) References Cited

U.S. PATENT DOCUMENTS

| | | | | |
|---|---|---|---|---|
| 2018/0077120 | A1* | 3/2018 | Baughman | H04L 67/563 |
| 2021/0377304 | A1* | 12/2021 | Ma | H04L 63/168 |

OTHER PUBLICATIONS

Le Ponchat, et al., "Tranco: A Research-Oriented Top Sites Ranking Hardened Against Manipulation", Network and Distributed Systems Security (NDSS) Symposium 2019, Feb. 2019, 15 pages <https://dx.doi.org/10.14722/ndss.2019.23386>.

Sergeev, "IoC detection experiments with ChatGPT", Securelist, Feb. 15, 2023, [online], [retrieved on Jun. 17, 2024] Retrieved from the Internet: <https://securelist.com/ioc-detection-experiments-with-chatgpt/108756/>.

* cited by examiner

ROOT DOMAIN BENIGNITY EVALUATION

BACKGROUND

The disclosure generally relates to data processing (e.g., CPC subclass G06F) and to computing arrangements based on specific computational models (e.g., CPC subclass G06N).

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and LLaMA. Foundation models are based on artificial neural networks including generative adversarial networks (GANs), transformers, and variational encoders. For instance, some large language models (LLMs) are based on transformer architecture. An LLM is "large" because the training parameters are typically in the billions. LLMs can be pre-trained to perform general-purpose tasks or tailored to perform specific tasks. Tailoring of language models can be achieved through various techniques, such as prompt engineering and fine-tuning.

Domain names serve as human-readable addresses that map to IP addresses of websites and Internet-accessible resources. As the number of registered domain names continues to grow exponentially, the management and security of domain names has become increasingly important, as domain names are often exploited for malicious purposes. For instance, domain names that mimic legitimate websites (a practice known as "typosquatting" or "domain squatting") are often registered to deceive users into providing sensitive information, such as usernames, passwords, and credit card details. Additionally, malicious domain names can be used to spread malware, conduct phishing attacks, or participate in botnet operations. Traditional methods of domain name evaluation to identify those that are malicious often rely on static allowlists/blocklists and rule-based systems to identify and block malicious domains.

BRIEF DESCRIPTION OF THE DRAWINGS

Embodiments of the disclosure may be better understood by referencing the accompanying drawings.

DESCRIPTION

Figure 1:
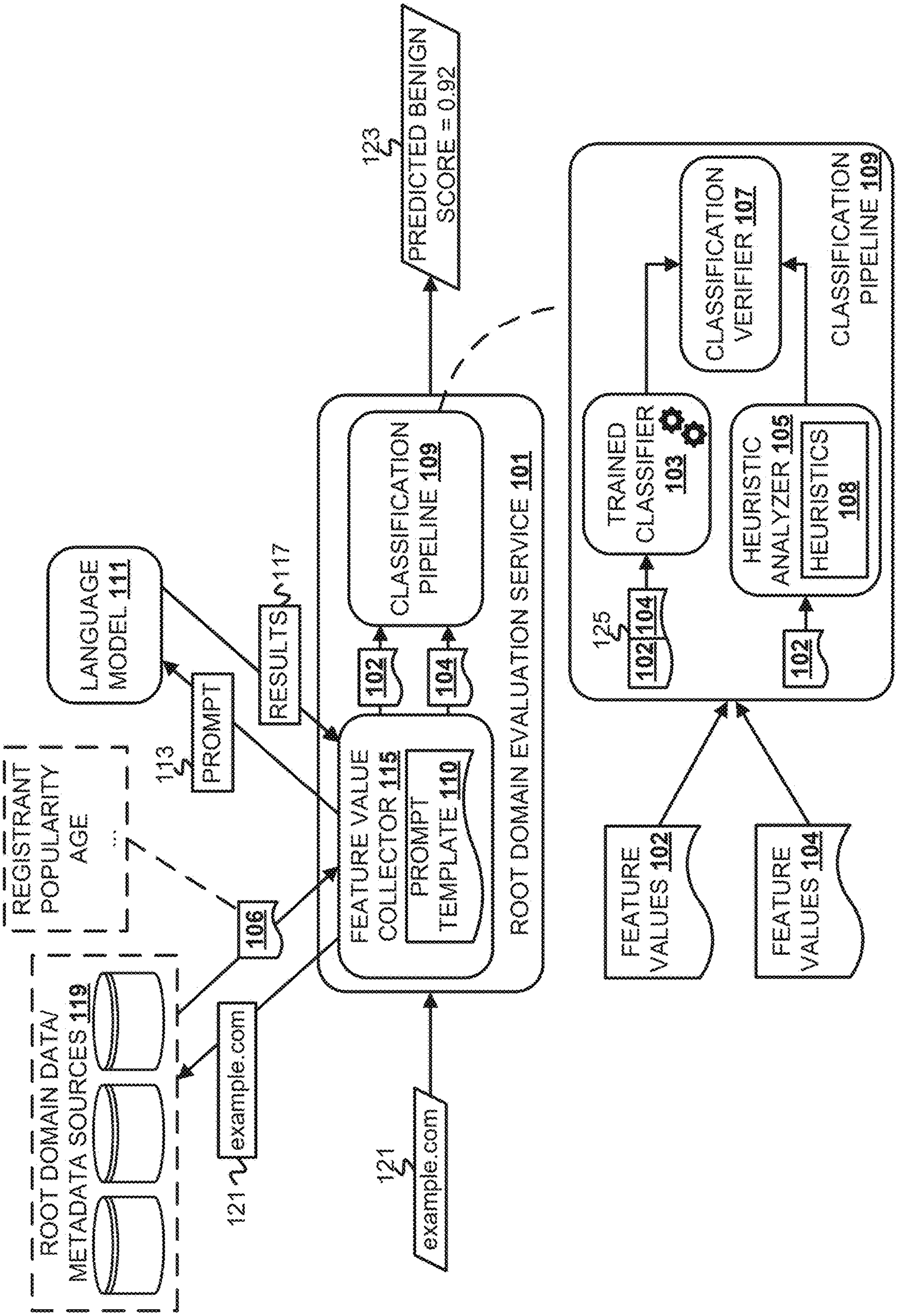
FIG. 1 is a conceptual diagram of evaluating benignity of a root domain based partly on prompting a language model with task instructions for benignity evaluation.

The description that follows includes example systems, methods, techniques, and program flows to aid in understanding the disclosure and not to limit claim scope. Well-known instruction instances, protocols, structures, and techniques have not been shown in detail for conciseness.

Overview

Traditional detectors for malicious domain names, including machine learning-based detection, can be prone to false positive detections. Static allowlists and/or blocklists can prevent false positive detections, but the static nature of these lists lack flexibility. Additionally, domain names that are truly owned by an attacker or that are actually benign but temporarily compromised can be challenging to differentiate between. To address this, techniques for benign root domain detection that leverage the capabilities of language models as part of a classification pipeline are disclosed herein. The disclosed root domain evaluation service evaluates root domains based on feature values corresponding to data/metadata of root domains as well as based on results of prompting a language model to evaluate benignity of root domains.

For a root domain designated for evaluation, the service prompts a language model with task instructions for various evaluations of aspects of the root domain that inform a prediction of whether the root domain is benign. Examples of evaluations informative to benignity that may be indicated in the task instructions include brand name evaluation to determine whether the root domain is associated with a benign/legitimate domain name, evaluation of the domain name text to determine if the domain name appears to correspond to typosquatting and/or social engineering (e.g., phishing) attacks, and search engine result summarization and evaluation thereof. A prompt template comprising the task instructions has been engineered so that results of the benignity evaluations provided by the language model can be leveraged to obtain first feature values of the root domain. The service also determines second feature values of the root domain based on data and/or metadata of the root domain, such as registrant, age, popularity data, and reputation data. The service evaluates the first and second feature values with a classification pipeline that includes a trained classifier and a heuristic analyzer. The trained classifier accepts a feature vector comprising the first and second feature values as input and predicts whether the associated root domain is benign based on the combination of feature values. For the second feature values determined based on data/metadata of the room domain, the heuristic analyzer analyzes these second feature values based on heuristics for benign domain name detection to further inform a verdict of whether the root domain is benign. The results of heuristic analysis can be used to corroborate or supplement the prediction output by the trained classifier to provide a final benignity verdict output by the classification pipeline.

Example Illustrations

FIG. 1 is a conceptual diagram of evaluating benignity of a root domain based partly on prompting a language model with task instructions for benignity evaluation. A root domain evaluation service ("evaluation service") 101 evaluates benignity of root domains based on values of a plurality of domain name features, where a subset of these feature values are determined based on prompting a language model to evaluate benignity of a root domain. This example describes the evaluation service 101 evaluating benignity of a root domain 121, given as "example.com". The evaluation service 101 can obtain root domains such as the root domain 121 via submission of user queries. In other examples, the evaluation service 101 can obtain root domains from a data structure or a database comprising root domains to be evaluated. In this case, root domain evaluation can be triggered periodically (e.g., daily).

The evaluation service 101 comprises a feature value collector 115 that determines feature values of the root domain 121. The feature value collector 115 collects a first set of feature values of the root domain 121 based at least partly on querying root domain data/metadata sources 119. These features of root domains for which the feature value collector 115 determines values are those often used for domain name classification, such as registrant information, domain name popularity, age, reputation data, an indication of whether the root domain has a non-expired Transport Layer Security (TLS) certificate, etc. These features have been previously determined, such as based on feature extraction and/or expert knowledge. The root domain data/metadata sources 119 can thus include databases that maintain registrant information (e.g., the WHOIS database), popularity and reputation information, age of the root domain, passive Domain Name System (DNS) data, and the like and are accessible via a query interface or an application programming interface (API). One or more of these root domain data/metadata sources 119 may be internal databases maintained by a cybersecurity provider that provides the root domain evaluation service 101, such as an internal database that maintains domain name reputation information. The evaluation service 101 can also determine one or more of the first feature values based on lexical analysis of the root domain.

To illustrate, the following table shows example features used from each of a plurality of example feature categories. The first feature values can include values determined for features within the "Lexical Features," "Hosting Features," "WHOIS Features," "Certificate Features," "Popularity Features," and/or "Reputation Features" categories, for example. Implementations can use different feature categories and/or different features within categories.

TABLE 1

Example Feature Categories and Features Per Category

| Feature Name | Brief Description |
|---|---|
| | Lexical Features |
| tld_reputation | Reputation of the TLD (Top Level Domain) as determined by in-house TLD reputation system |
| num_brands | Number of popular brands in the domain name based on the list of targeted brands |
| fake_tld | The presence of a fake TLD within the domain name |
| entropy | Shannon entropy of the domain name |
| num_dashes | Number of dashes in the domain name |
| num_pop_keywords | Number of popular keywords such as verify, signup, secure, and login in the domain name |
| | Hosting (PDNS) Features |
| duration | Hosting duration of the domain |
| num_Ips | Number of Ips on which the domain is hosted in the last 30 days |
| num_subnet_24 | Number of subnet/24 on which the domain is hosted in the last 3o days |
| num_ASNs | Number of ASNs (Autonomous System Names) on which the domain is hosted in the last 30 days |
| num_queries | Number of accesses of the domain in the last 30 days |
| | WHOIS (Registration) Features |
| domain_age | Age of the domain since the registration |
| num_days_to_expire | Number of days before the domain expires |
| num_days_last_updated | Number of days since last updated |
| is_reregistered | Is the domain re-registered? |
| Registrar_reputation | Reputation of the registrar as determined by the in-house reputation system |
| is_privacy_protected | Is the domain privacy protected? |
| | Certificate (TLS) Features |
| certificate_type | Type of the certificate identifying if DV (domain validated), OV (organization validated) or EV (extended validated) |
| duration | Duration of the certificate |
| num_domains | Number of SAN domains in the certificate |
| is_wildcard | Is the certificate a wild card? |
| | Generative Artificial Intelligence (AI) Features |
| content_category | The category of the website such as shopping, gambling, gaming, news, and so on. |
| Benign_score | The benign score based on the content summary and lexical features of the domain name |
| known_brand | Presence of known brand in the content |
| urgency | Presence of urgency in the content |
| social_engineering | Social engineering attack techniques found |
| typo_squatting | Indicators of typosquatting techniques |
| similar_domains | Domains that are similar and in the same category |
| | Popularity Features |
| present_in_tranco | Whether the domain is present in Tranco 1 million popularity list |
| num_customer_devices | Number of customer devices accessed the domain name in the last 30 days |
| num_customer_queries | Number of customer queries to the domain in the last 30 days |
| | Reputation Features |
| domain_reputation_score | Domain reputation score as computed from the in-house reputation system |
| avg_reputation_of_Ips | Average reputation of the IP addresses on which the domain is hosted |
| avg_reputation_of_ASNs | Average reputation of the ASNs on which the domain is hosted |
| | Search Engine and Social Media Features |
| presence_in_first_page | Whether the domain is present in the first page of the search result |
| presence_of_linkedin_ac | Whether the domain has a linked in website |
| search_rank | The search rank of the domain |
| num_search_results | Number of relevant search results |

The evaluation service 101 queries each of the root domain data/metadata sources 119 for the root domain 121 to obtain data/metadata 106 of the root domain 121. The feature value collector 115 determines feature values based on the data/metadata 106, such as based on certain field-value pairs of the data/metadata 106 that correspond to feature values and/or by copying respective ones of the data/metadata 106 into a data structure. The feature value collector 115 includes the feature values determined based on the data/metadata 106 and any other feature values determined based on analysis of the root domain (e.g., a lexical analysis-based feature value) in a first set of feature values, depicted as feature values 102. These feature values may be stored in a data structure, for instance.

The evaluation service 101 also determines a second set of feature values of the root domain 121 based on prompting a language model 111 to evaluate benignity of the root domain 121. The language model 111 may be an LLM with which the evaluation service 101 interfaces, such as via an API of the LLM. The evaluation service 101 generates a prompt 113 based on a prompt template 110. The prompt template 110 comprises task instructions for evaluating benignity of a domain name in various aspects and has been engineered to guide the language model 111 in determining whether a root domain is benign or suspicious. For instance, the prompt template 110 can comprise task instructions to determine if the root domain is indicative of a social engineering attack or typosquatting and/or to determine if the root domain is associated with a legitimate or reputable brand name. The prompt template 110 can also comprise task instructions to determine the top N search results for the root domain, summarize the top N search results, and determine based on the summary if the root domain is benign or suspicious. The prompt template 110 can also comprise a task instruction to determine a score indicating benignity of the root domain based on one or more examples of known benign and/or suspicious root domains, example results of benignity evaluation of these root domains, and their respective scores. An example of a portion of a prompt template with which the feature value collector 115 can be configured is reproduced below. The task instructions ("sub-tasks") are examples and can vary in implementations:

You are a helpful Internet security research assistant chatbot. Your goal is to examine a root domain to determine if it is benign or not. To complete this task, follow these sub-tasks for the root domain {ROOT-_DOMAIN}:

1. Analyze the root domain for any social engineering techniques often used in malicious attacks. Point out any suspicious elements found in the HTML, URL, or text.
2. Identify the brand name in the root domain. If the root domain appears to resemble a legitimate web page, verify if the root domain matches the legitimate domain name associated with the brand, if known.
3. Identify if the root domain is a known typosquatting domain, if it is, it should not be determined to be benign.
4. Identify the top 5 search engine results for the domain. If the domain is associated with any well-known/popular websites, it is benign.
5. Summarize the search engine results ("SE_results") and determine from the summary if the root domain is benign or suspicious.
6. State your conclusion on whether the URL is benign or not and explain your reasoning. If there is insufficient evidence to make a determination, answer "unknown."
7. Submit your findings as a JSON-formatted output with the following keys:
   root domain: string
   benign_score: int (indicates benign on a scale of 0 to 10)
   brands: string (identified brand name or None if not applicable)
   suspicious_domain: boolean (whether the domain name is suspected not to be legitimate)

. . . .

The feature value collector 115 obtains results 117 from the language model 111. The results 117 indicate results of evaluating benignity of the root domain 121, such as a prediction of whether the root domain is benign and a score indicating benignity of the root domain (e.g., on a scale of 0 to 10, where 10 indicates high confidence in benignity), among other possibilities. The feature value collector 115 determines a second set of feature values of the root domain 121, depicted as feature values 104, based on the results 117. Examples of such features for which the feature value collector 115 determines values using the language model 111 are given in Table 1 in the "Generative AI" category and can also include features included in the "Search Engine and Social Media Features" category. The feature value collector 115 can determine the feature values 104 based on the results 117 by copying the corresponding text (e.g., the values of the corresponding key-value pairs in a JSON formatted response). For instance, the feature value collector 115 can obtain the benignity score, the indication of whether the domain name appears to be associated with social engineering and/or typosquatting, whether the domain name is associated with a reputable brand name, etc. from the results 117 and use these values as the feature values 104. The feature values 104 can be stored in another data structure or in a same data structure as the feature values 102 with a label, tag, etc. associated with each feature value to indicate the subset to which the feature value corresponds.

The evaluation service 101 comprises a classification pipeline 109 that classifies root domains as benign or suspicious. The classification pipeline 109 comprises a trained classifier 103 and a heuristic analyzer 105. The trained classifier 103 has been trained to classify root domains as benign or suspicious based on a plurality of features, where the feature values 102, 104 correspond to these features. As an example, the trained classifier 103 can be a random forest classifier or neural network. The trained classifier 103 was previously trained on feature vectors comprising feature values obtained for known benign and suspicious root domains. The heuristic analyzer 105 analyzes the feature values corresponding to data/metadata of the root domain (the feature values 102 in this example) based on heuristics 108. The verdict by the heuristic analyzer 105 thus supplements the verdict by the trained classifier 103 since the feature values 104 obtained based on the evaluation by the language model 111 may be impacted by inconsistencies, hallucinations, etc. due to the nature of language models.

To obtain a verdict by the trained classifier 103, the evaluation service 101 generates a feature vector 125 comprising the feature values 102 and the feature values 104 and inputs the feature vector 125 into the trained classifier 103. The trained classifier 103 outputs a prediction as to whether the root domain 121 is benign. The evaluation service 101 can also obtain a score for the prediction, such as based on the outputs of a softmax function used in the trained classifier 103, a proportion of decision trees in a random forest that predicted the majority verdict, etc. The evaluation service 101 can also augment the output of the trained classifier 103 by providing the features that are most important to or had the greatest impact on the predicted class of the root domain 121 output by the trained classifier 103 to provide an explanation for the prediction and aid in interpretation of the prediction. For instance, the evaluation service 101 can leverage SHAP (SHapley Additive explanations) and/or LIME (Local Interpretable Model-agnostic Explanations) to determine the most important/greatest impact feature(s) to the classification of the root domain 121 output by the trained classifier 103 and indicates the feature(s) determined with SHAP and/or LIME with the prediction output by the trained classifier 103.

The heuristic analyzer 105 analyzes the feature values 102 based on the heuristics 108. The heuristics 108 can be implemented as rules, with each rule indicating one or more criteria, such as one or more thresholds and/or ranges of values. The heuristic analyzer 105 can also determine a score indicating benignity of the root domain 121 based on analysis with the heuristics 108. For instance, the heuristic analyzer 105 can assign a default score to the root domain 121, and the score can be adjusted (e.g., increased or decreased) based on the heuristics 108. As an example, the heuristics 108 can comprise a rule for heuristically analyzing age of a root domain, where the rule indicates two or more thresholds and/or ranges of values and a corresponding score adjustment to make depending on the age of the root domain. The age of the root domain is thus evaluated based on the thresholds and/or ranges, and the score determined for the root domain is based on which threshold/range the root domain's age satisfies. To further illustrate, root domains that are very new or very old, which is quantified by the age being below a threshold or above a threshold, may cause the benignity score to be reduced or otherwise adjusted to indicate a lower likelihood of benignity since these root domains are more likely to be compromised for malicious use (in the case of old domains) or new domains registered for malicious purposes (in the case of new domains). Scoring techniques designated by the heuristics 108 may have been developed based on prior analysis of known suspicious and/or malicious and known benign root domains and/or based on expert knowledge.

The heuristic analyzer 105 may normalize the final score determined for the root domain 121, such as by normalizing this score within a range of 0 to 1 based on minimum and maximum possible scores that can be computed as a result of analysis based on the heuristics 108. Scores can also be associated with a benign or suspicious verdict, where the heuristic analyzer 105 also maintains one or more criteria (e.g., a threshold(s)) for classifying a root domain as benign or suspicious based on a final score determined for the root domain 121.

A classification verifier 107 verifies predicted class of the root domain 121 output by the trained classifier 103 and the heuristic analyzer 105 before a verdict is provided for the root domain 121. The classification verifier 107 determines whether the predictions by the trained classifier 103 and heuristic analyzer 105 agree. If the predictions do not agree, such as if the trained classifier 103 predicted that the root domain 121 is benign and the heuristic analyzer 105 predicted that the root domain 121 is suspicious, the classification verifier 107 can provide a benign verdict to prevent erroneous detection of a suspicious root domain. This verdict may be further informed by the scores determined for the root domain in association with prediction by the trained classifier 103 and heuristic analysis by the heuristic analyzer 105. For instance, if the trained classifier 103 output a prediction that the root domain 121 is suspicious but with a low score indicating probability or confidence in this classification and the heuristic analyzer 105 determined that the root domain 121 is likely benign with a higher score, the classification verifier 107 can assign a final classification of the root domain 121 as benign.

The evaluation service 101 generates a verdict 123 indicating a classification output by the classification pipeline 109 (based on verification of results by the classification verifier 107) and a score. To generate the score, the evaluation service 101 may aggregate (e.g., average) the scores obtained from classification by the trained classifier 103 and analysis by the heuristic analyzer 105. The verdict 123 can also indicate the feature(s) of the root domain 121 that was/were most important to classification of the root domain 121, such as based on the results of leveraging SHAP and/or LIME with the trained classifier 103. This example depicts the verdict 123 as indicating that the root domain 121 is predicted to be benign and having a benignity score of 0.92, which is recognized as a score indicating high likelihood of benignity by the evaluation service 101. The evaluation service 101 may generate a report or notification indicating the verdict 123 that is provided as output (e.g., via a User Interface (UI)) and/or stored in a database, store the verdict 123 in a database in an entry corresponding to the root domain 121, etc. In implementations where the evaluation service 101 evaluates multiple root domains, such as based on periodic triggering of evaluation of root domains, the evaluation service 101 can add the verdict 123 and an indication of the root domain 121 to a report that indicates verdicts across root domains designated for evaluation.

Figure 2:
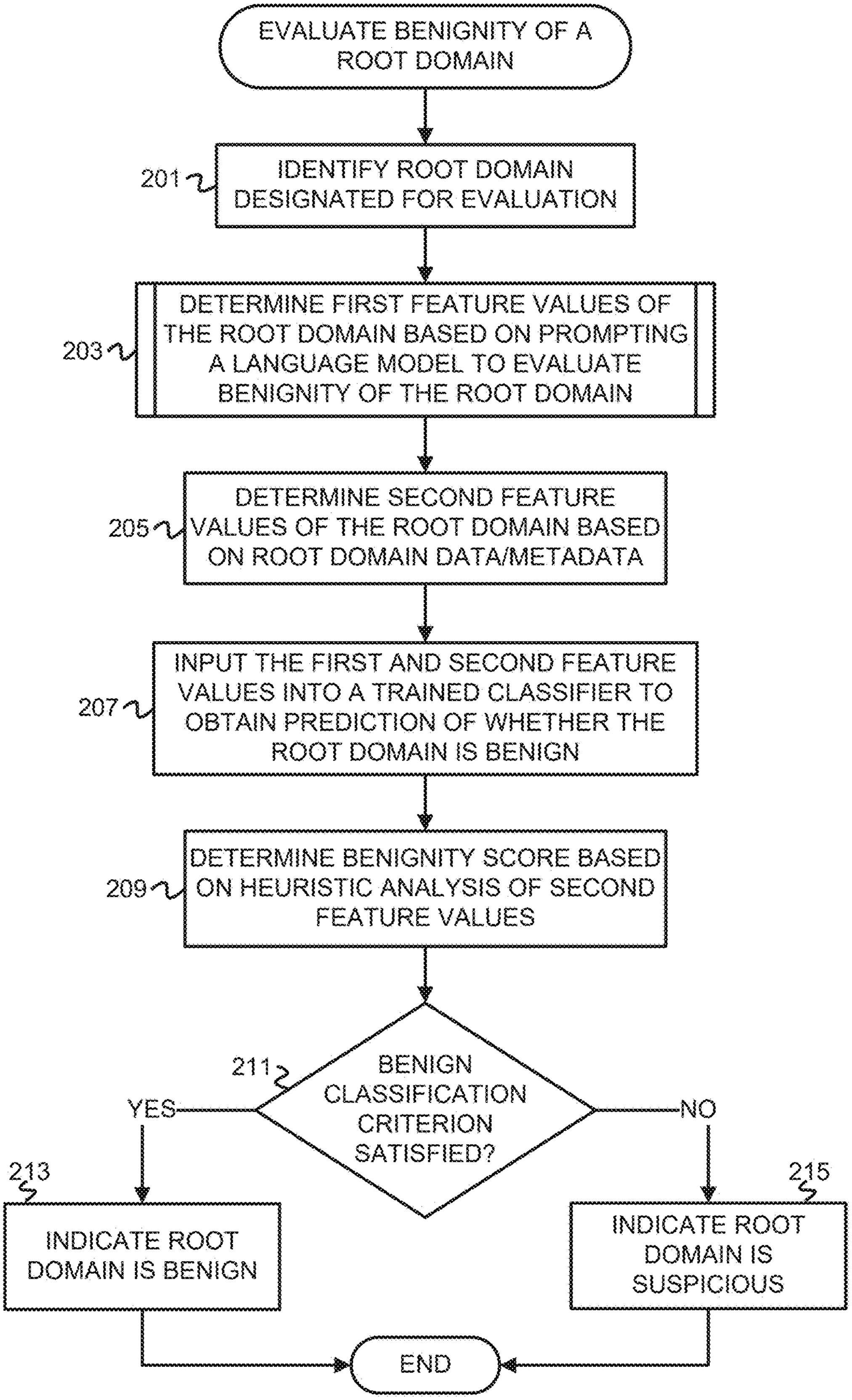
FIG. 2 is a flowchart of example operations for evaluating benignity of a root domain.
Figure 3:
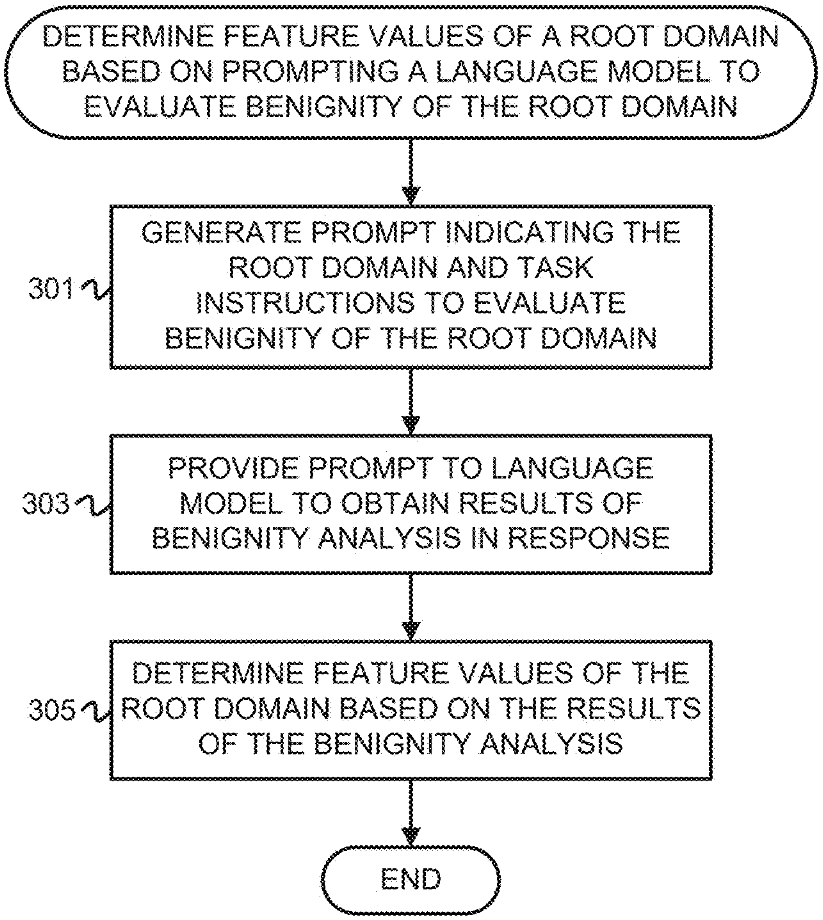
FIG. 3 is a flowchart of example operations for determining feature values of a root domain based on prompting a language model to evaluate benignity of the root domain.

FIGS. 2 and 3 are flowcharts of example operations. The example operations are described with reference to a root domain evaluation service (hereinafter simply "the evaluation service") for consistency with FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for evaluating benignity of a root domain. A plurality of features of domain names have previously been determined to be pertinent to benignity evaluation (e.g., based on feature extraction). The example operations refer to determining values of these features.

At block 201, the evaluation service identifies a root domain designated for evaluation. Root domains may be submitted to the evaluation service for evaluation, such as via a UI. The evaluation service can also identify root domains designated for evaluation in a data store (e.g., a repository) or a data structure and obtain the root domain from the data store or data structure. In implementations, the evaluation service can determine a root domain to be evaluated based on a domain name (e.g., a fully qualified domain name (FQDN)) provided for analysis by extracting (e.g., copying) the root domain from the domain name.

At block 203, the evaluation service determines first feature values of the root domain based on prompting a language model to evaluate benignity of the root domain. The evaluation service determines values of first features based on prompting a language model (e.g., an LLM) to evaluate benignity of the root domain. The evaluation service has been configured with a prompt template that comprises a plurality of task instructions for evaluating benignity of root domains. The evaluation service prompts the language model with a prompt corresponding to the prompt template having an indication of the root domain inserted therein. From a response to the prompt, the evaluation service determines the first feature values of the root domain. Determination of feature values of a root domain based on prompting a language model to evaluate benignity of the root domain is described in further detail in reference to FIG. 3.

At block 205, the evaluation service determines second feature values of the root domain based on data and/or metadata of the root domain. These second features can include popularity of the domain name, an age of the domain name, passive Domain Name System (pDNS) data of the domain name, a registrant of the domain name, and an indication of whether the root domain is associated with a non-expired TLS certificate, for example. These data/metadata can be obtained and the respective feature values determined based on querying respective data/metadata sources (e.g., databases). To obtain these data/metadata associated with the root domain, the evaluation service queries respective data/metadata sources for the root domain via an API or query interface of each data/metadata source. Examples of data/metadata sources include the WHOIS database that maintains registrant and age information and a pDNS database. The data/metadata sources may further include an internal database(s) of a cybersecurity provider with which the evaluation service is associated that stores domain name data/metadata collected by the cybersecurity provider. As another example, if the evaluation service has access to a uniform resource locator(s) (URL(s)) associated with the root domain, the evaluation service can determine a protocol associated with the root domain, which may be indicative of whether the root domain has a TLS certificate associated therewith. These second feature values can further include lexical features of the root domain. Examples of features for which values are determined are depicted above in Table 1.

At block 207, the evaluation service inputs the first and second feature values into a trained classifier to obtain a prediction of whether the root domain is benign. The trained classifier was previously trained to predict whether root domains are benign based on a plurality of features (i.e., those to which the first and second feature values correspond), including those for which values are obtained based on prompting a language model to evaluate benignity of the root domain. For instance, the trained classifier can be a random forest classifier or a neural network. The evaluation service creates a feature vector comprising the first and second feature values and inputs the feature vector into the trained classifier to obtain a prediction as to whether the root domain is benign as output. The evaluation service can also determine a score associated with the prediction by the trained classifier that can be considered a likelihood or confidence score of the verdict. For instance, the evaluation service can determine the score based on a corresponding output of a softmax function of the trained classifier if the trained classifier comprises a neural network. As another example, the evaluation service can determine the score based on a proportion of decision trees that agreed with the majority verdict if the trained classifier comprises a random forest.

At block 209, the evaluation service determines a benignity score of the root domain based on heuristic analysis of the second feature values. The evaluation service has been configured with heuristics for evaluating root domain feature values that were determined based on data/metadata of root domains. The heuristics can be implemented with criteria and/or thresholds, each of which is associated with a score or score adjustor (e.g., a multiplier, a value based on which to increase or decrease a score, etc.). Whether a high or low score corresponds to a benign domain has been previously established and reflected in the scoring of feature values. The evaluation service scores the root domain based on which of the criteria and/or thresholds are satisfied by the second feature values. For instance, the evaluation service can assign a default score to the root domain and adjust the score based on how the second feature values of the root domain satisfy the criteria and/or thresholds. The evaluation service may then normalize the score (e.g., to be within a range from 0 to 1), such as based on maximum and minimum possible scores resulting from heuristic analysis.

At block 211, the evaluation service determines if a benign classification criterion is satisfied. The evaluation service is configured with one or more criteria for classifying a root domain as benign that are based on the prediction by the trained classifier and based on results of heuristic analysis. The criterion (a) can indicate that the root domain should be classified as benign if both heuristic analysis and prediction with the trained model yielded a verdict that the root domain is benign. The criterion (a) can also indicate that the root domain should be classified as benign if prediction with either the trained model or heuristic analysis yielded a benign verdict to reduce false detection of suspicious root domains. Classification as benign based on the criterion (a) can also be based on the score determined based on classification with the trained classifier, the score determined based on heuristic analysis, both scores individually, or an aggregate of these scores. If the criterion is satisfied, operations continue at block 213. If the criterion is not satisfied, operations continue at block 215.

At block 213, the evaluation service indicates that the root domain is benign. The evaluation service can generate a report or notification indicating the root domain and verdict, add the root domain to a list or other data structure of benign root domains, store an indication of the root domain and verdict to a database, etc.

At block 215, the evaluation service indicates that the root domain is suspicious. The evaluation service can generate a report or notification indicating the root domain and verdict, add the root domain to a list or other data structure of suspicious root domains, store an indication of the root domain and verdict to a database, etc.

FIG. 2 describes the evaluation service identifying root domains designated for evaluation. In implementations, evaluation of root domains stored in a data store or data structure can be periodically (e.g., daily) triggered. This may be the case for re-evaluation of root domains for which a malicious, suspicious, etc. verdict has been published in the event that any issues to which the verdict is attributable have been resolved, particularly in the event that a root domain received the initial verdict due to being temporarily compromised but has had its integrity restored. For these cases, the evaluation service performs the example operations for each root domain of the plurality designated for evaluation.

FIG. 3 is a flowchart of example operations for determining feature values of a root domain based on prompting a language model to evaluate benignity of the root domain. At block 301, the evaluation service generates a prompt indicating the root domain and task instructions to evaluate benignity of the root domain. The evaluation service generates the prompt based on a prompt template and the root domain to be evaluated. The prompt template indicates task instructions for evaluating benignity of a root domain. The prompt template can also include a task instruction to determine a score indicating benignity of the root domain with examples of how to score benignity of root domains based on the results of the benignity evaluations, which can further include an example of a benign root domain with a score indicating it is likely benign and an example of a suspicious root domain with a score indicating it is suspicious. Example results of completing one or more of the task instructions, such as example scoring of a root domain, are provided in the prompt to aid in one- or few-shot prompting to guide the language model in benignity evaluation.

At block 303, the evaluation service provides the prompt to a language model to obtain in response results of the benignity analysis. The response from the language model can be in a format specified in the prompt (e.g., a JavaScript® Object Notation (JSON) formatted response).

At block 305, the evaluation service determines feature values of the root domain based on the results of the benignity analysis. Feature values can be obtained directly from the response and/or based on evaluation of the response by the evaluation service. For instance, the evaluation service can determine one or more feature values based directly on the response. Examples of feature values that the evaluation service can determine from the response include an indication of the brand name, an indication of whether the domain name is predicted to be suspicious, and a benignity score provided by the language model. If the prompt template does not include a task instruction to score benignity of the root domain, and a score is a feature for which a value should be determined, the evaluation service can also perform scoring based on heuristics, rules, etc. for scoring benignity of a root domain.

VARIATIONS

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a “circuit,” “module” or “system.” The functionality presented as individual modules/units in the example illustrations can be organized differently in accordance with any one of platforms (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
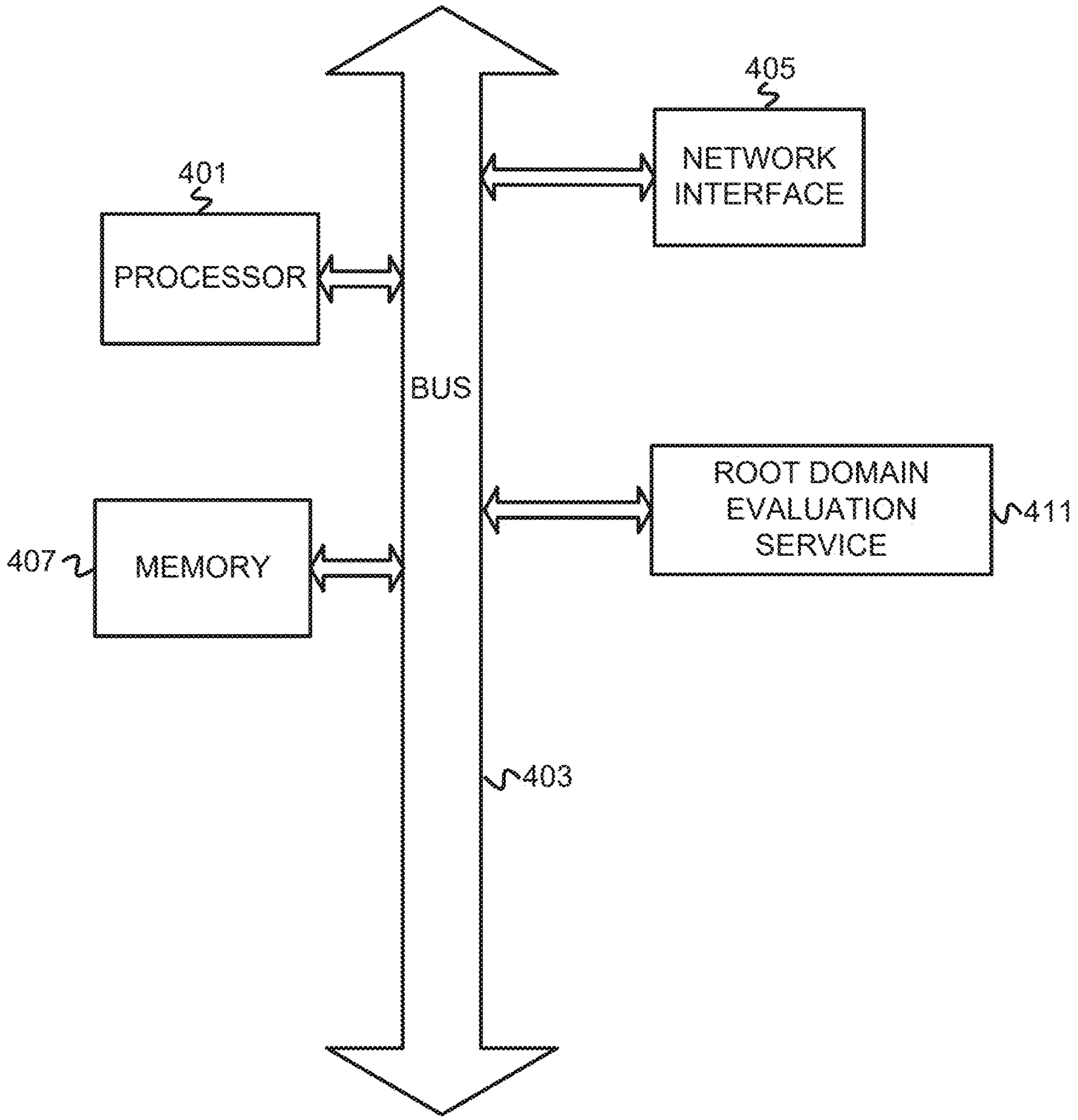
FIG. 4 depicts an example computer system with a root domain evaluation service.

FIG. 4 depicts an example computer system with a root domain evaluation service. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes root domain evaluation service 411. The root domain evaluation service 411 evaluates benignity of root domains based on a plurality of feature values, including a first set of feature values obtained based on prompting a language model to evaluate benignity of a root domain and a second set of feature values obtained based on data and/or metadata of the root domain. The root domain evaluation service 411 comprises a classification pipeline that classifies root domains as benign or suspicious based on running a trained classifier with a feature vector comprising the first and second sets of feature values and based on heuristic analysis of the second set of feature values. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

TERMINOLOGY

Use of the phrase “at least one of” preceding a list with the conjunction “and” should not be treated as an exclusive list and should not be construed as a list of categories with one item from each category, unless specifically stated otherwise. A clause that recites “at least one of A, B, and C” can be infringed with only one of the listed items, multiple of the listed items, and one or more of the items in the list and another item not listed.

The invention claimed is:

1. A method comprising:

determining values of a plurality of features of a domain name, wherein determining the values of the plurality of features comprises, generating a first prompt comprising the domain name and a plurality of task instructions to evaluate benignity of a provided domain name and prompting a language model with the first prompt, wherein a response to the first prompt obtained from the language model comprises results of evaluating benignity of the domain name;

determining values of a first subset of the plurality of features based on the results of evaluating benignity of the domain name obtained from prompting the language model with the first prompt; and determining values of a second subset of the plurality of features of the domain name based on querying one or more data sources for the domain name;

inputting the values of the plurality of features into a classification pipeline, wherein the classification pipeline comprises a classifier that was previously trained to predict whether domain names are benign, wherein an output of the classification pipeline comprises a prediction of whether the domain name is benign; and determining if the domain name is benign based, at least in part, on the prediction obtained from the output of the classification pipeline.

2. The method of claim 1, wherein the plurality of task instructions comprises at least one of a task instruction to determine a brand name associated with the domain name, a task instruction to determine if the domain name is indicative of a social engineering attack, and a task instruction to determine if the domain name is indicative of typosquatting.

3. The method of claim 1, wherein the plurality of task instructions comprises task instructions to determine one or more search results for the domain name, summarize the one or more search results to generate a summary, and determine if the domain name is benign based on the summary of the search results.

4. The method of claim 1, further comprising determining a score indicating benignity of the domain name based on evaluating the values of the second subset of features based on a plurality of heuristics, wherein determining if the domain name is benign is also based on the score indicating benignity of the domain name.

5. The method of claim 4, wherein determining if the domain name is benign comprises verifying the output of the classifier based on the score indicating benignity of the domain name.

6. The method of claim 4, wherein evaluating the second subset of features based on the plurality of heuristics comprises evaluating each feature value of the values of the second subset of features based on one or more respective criteria, wherein determining the score comprises determining the score based on results of evaluating the values of each of the second subset of features based on the one or more respective criteria.

7. The method of claim 1, wherein the second subset of features comprises one or more of an indication of popularity of the domain name, an age of the domain name, search engine results from searching the domain name, passive Domain Name System (pDNS) data of the domain name, a lexical feature of the domain name, and a registrant of the domain name.

8. The method of claim 1, wherein the domain name is a root domain.

9. The method of claim 1, wherein querying the one or more data sources for the domain name comprises querying one or more of the WHOIS database, a passive Domain Name System (pDNS) database, and an internal database maintained by a cybersecurity provider for the domain name.

10. One or more non-transitory machine-readable media having program code stored thereon, the program code comprising instructions to:

determine values of a first plurality of features of a first domain name based on prompting a language model, wherein the instructions to determine the values of the first plurality of features of the first domain name based on prompting the language model comprise instructions to, generate a first prompt comprising the first domain name a plurality of task instructions, wherein the plurality of task instructions comprise first task instructions to evaluate benignity of a domain name and a second task instructions to provide the values of the first plurality of features based on results of the evaluation of benignity; and determine the values of the first plurality of features of the first domain name based on a result of prompting the language model with the first prompt;

determine values of a second plurality of features of the first domain name based on querying one or more data sources for the first domain name;

input the values of the first and second pluralities of features into a classification pipeline, wherein the classification pipeline comprises a classifier that was previously trained to predict whether domain names are benign, wherein an output of the classification pipeline comprises a prediction of whether the first domain name is benign; and determine whether the first domain name is benign based, at least in part, on the prediction obtained from the output of the classification pipeline.

11. The non-transitory machine-readable media of claim 10, wherein the program code further comprises instructions to evaluate the values of the second plurality of features based on a plurality of heuristics and determine a score indicating benignity of the domain name based on the evaluation, wherein the determination of whether the first domain name is benign is also based on the score indicating benignity of the first domain name.

12. The non-transitory machine-readable media of claim 11, wherein the instructions to evaluate the values of the second plurality of features based on the plurality of heuristics comprise instructions to evaluate each of the values of the second plurality of features based on one or more respective criteria, wherein the instructions to determine the score comprise instructions to determine the score based on results of evaluation of each of the values of the second plurality of features based on the one or more respective criteria.

13. The non-transitory machine-readable media of claim 10, wherein the plurality of task instructions comprises at least one of a task instruction to determine a brand name associated with the domain name, a task instruction to determine if the domain name is indicative of a social engineering attack, a task instruction to determine if the domain name is indicative of typosquatting, and task instructions to determine one or more search results for the domain name, summarize the one or more search results to generate a summary, and determine if the domain name is benign based on the summary of the search results.

14. An apparatus comprising:

a processor; and a machine-readable medium having instructions stored thereon that are executable by the processor to cause the apparatus to, determine values of a first plurality of features of a domain name, wherein the instructions executable by the processor to cause the apparatus to determine the values of the first plurality of features comprise instructions executable by the processor to cause the apparatus to, generate a prompt to a language model comprising a plurality of task instructions to evaluate benignity of a domain name and provide the values of the first plurality of features based on results of the evaluation of benignity; and determine the values of the first plurality of features of the domain name based on a result of prompting the language model with the generated prompt;

determine values of a second plurality of features of the domain name based on querying one or more data sources for the domain name;

input the values of the first and second pluralities of features into a classification pipeline, wherein the classification pipeline comprises a classifier that was previously trained to predict whether domain names are benign, wherein an output of the classification pipeline comprises a prediction of whether the domain name is benign; and determine if the domain name is benign based, at least in part, on the prediction obtained from output of the classification pipeline.

15. The apparatus of claim 14, further comprising instructions executable by the processor to cause the apparatus to determine a score indicating benignity of the domain name based on evaluation of the values of the second plurality of features based on a plurality of heuristics, wherein the determination of if the domain name is benign is also based on the score indicating benignity of the domain name.

16. The apparatus of claim 15, wherein the instructions executable by the processor to cause the apparatus to evaluate the values of the second plurality of features based on the plurality of heuristics comprise instructions executable by the processor to cause the apparatus to evaluate each of the values of the second plurality of features based on one or more respective criteria, wherein the instructions executable by the processor to cause the apparatus to determine the score comprise instructions executable by the processor to cause the apparatus to determine the score based on the evaluation of each of the values of the second plurality of features based on the one or more respective criteria.

17. The apparatus of claim 15, wherein the instructions executable by the processor to cause the apparatus to determine if the domain name is benign comprise instructions executable by the processor to cause the apparatus to verify the output of the classifier based on the score indicating benignity of the domain name.

18. The apparatus of claim 14, wherein the plurality of task instructions comprises at least one of a task instruction to determine a brand name associated with the domain name, a task instruction to determine if the domain name is indicative of a social engineering attack, a task instruction to determine if the domain name is indicative of typosquatting, and task instructions to determine one or more search results for the domain name, summarize the one or more search results to generate a summary, and determine if the domain name is benign based on the summary of the search results.

19. The apparatus of claim 14, wherein the second plurality of features comprises one or more of an indication of popularity of the domain name, an age of the domain name, passive Domain Name System (pDNS) data of the domain name, search engine results from searching the domain name, a lexical feature of the domain name, and a registrant of the domain name.

20. The apparatus of claim 14, wherein the domain name is a root domain.

* * * * *